(12) United States Patent
Cymbal et al.

(10) Patent No.: US 7,497,472 B2
(45) Date of Patent: Mar. 3, 2009

(54) STEERING COLUMN ASSEMBLY

(75) Inventors: William D. Cymbal, Freeland, MI (US);
Marvin V. Manwaring, Clio, MI (US);
Ravi Ravindra, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 275 days.

(21) Appl. No.: 11/448,222

(22) Filed: Jun. 7, 2006

(65) Prior Publication Data

US 2007/0284867 A1    Dec. 13, 2007

(51) Int. Cl.
*B62D 1/18* (2006.01)

(52) U.S. Cl. ............... 280/779; 280/775; 74/493

(58) Field of Classification Search ........... 280/775, 280/779; 180/90; 74/493; 296/70, 72, 73
See application file for complete search history.

(56) References Cited

U.S. PATENT DOCUMENTS 4,527,444 A    7/1985    McKee et al.
6,068,295 A *  5/2000    Skabrond et al. ............ 280/775
6,186,547 B1 * 2/2001    Skabrond et al. ............ 280/775
2001/0035642 A1* 11/2001 Gotz et al. .................. 280/779

* cited by examiner

*Primary Examiner*—John Q. Nguyen
*Assistant Examiner*—Drew J. Brown
(74) *Attorney, Agent, or Firm*—Thomas N. Twomey

(57) ABSTRACT

An adjustable steering column assembly includes a steering column with an outer jacket moveable along an axis. An instrument panel is coupled to the outer jacket. An instrument panel hood is connected to the instrument panel and the outer jacket. A support bracket includes a pair of support arms including flanges, with a first mounting component and a second mounting component connected to the flanges. The outer jacket is slideably coupled to the first mounting component and the instrument panel is slideably coupled to the second mounting component. The support bracket is pivotable about a pivot axis between an upper limit and a lower limit. A spring is attached to the support bracket for biasing the support bracket toward the upper limit. Coordinated movement between the instrument panel and the outer jacket is possible and the load from the instrument panel is diverted from the outer jacket to the support bracket.

21 Claims, 8 Drawing Sheets

STEERING COLUMN ASSEMBLY

BACKGROUND OF THE INVENTION

1. Field of the Invention

The present invention relates to an adjustable steering column assembly for operating a vehicle.

2. Description of the Prior Art

Adjustable steering column assemblies which allow an operator to adjust the position of the steering wheel are well known in the art. The most common adjustments make use of a telescoping steering column which permits longitudinal movement along the axis of the steering column, and a tilting steering column, which permits up and down movement of the steering column. The up and down movement of the tilting steering column is also sometimes referred to as a vertical movement or a raking movement.

Instrument panels provide operators with vehicle operating status information in the form of dials and gauges. Where instrument panels are attached to the vehicle body, the orientation and position of the instrument panel is fixed. This can cause the instrument panel to be obscured when an operator adjusts a steering column. An alternative is to mount the instrument panel to the steering column itself, so that when the steering column is adjusted, the instrument panel is adjusted with the steering column. An example of such an assembly is disclosed in U.S. Pat. No. 4,527,444 to McKee, et. al.

The adjustable steering column assembly of the McKee '444 Patent, permits the steering column to telescope and tilt, as previously discussed. The instrument panel is rigidly attached to the steering column. Though this construction allows coordinated movement of the instrument panel with the steering column, the added weight of the instrument panel adversely affects the strength and the Noise, Harshness and Vibration ("NHV") of the steering column. The additional weight can also cause difficulty in adjusting the steering column, particularly when tilting the column upward.

There remains a need for an adjustable steering column assembly in which the instrument panel moves with the steering column during telescoping and tilting movement, without adding weight to the steering column. In addition, the location of the instrument panel should address issues of NHV.

SUMMARY OF THE INVENTION AND ADVANTAGES

The present invention provides an adjustable steering column assembly for a vehicle having a steering column with an outer jacket moveable along an axis. An instrument panel is coupled to the outer jacket for coordinated movement with the outer jacket along the axis. A support bracket has a first mounting component coupled to the outer jacket for supporting the outer jacket during the coordinated movement relative to the first mounting component. A second mounting component is coupled to the instrument panel for supporting the instrument panel independently of the outer jacket during the coordinated movement relative to the second mounting component to alleviate any loads associated with the instrument panel from the outer jacket during the coordinated movement of the instrument panel and the outer jacket.

The instrument panel is easily and conveniently visible regardless of the position of the steering column resulting from the telescoping and tilting adjustments. The instrument panel is supported independently of the steering column, so the load associated with the instrument panel is not added to the steering column, making adjustment of the steering column easier. In addition, Noise, Harshness and Vibration ("NHV") as related to the instrument panel is reduced because the vibration from the steering column is not transmitted to the instrument panel.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
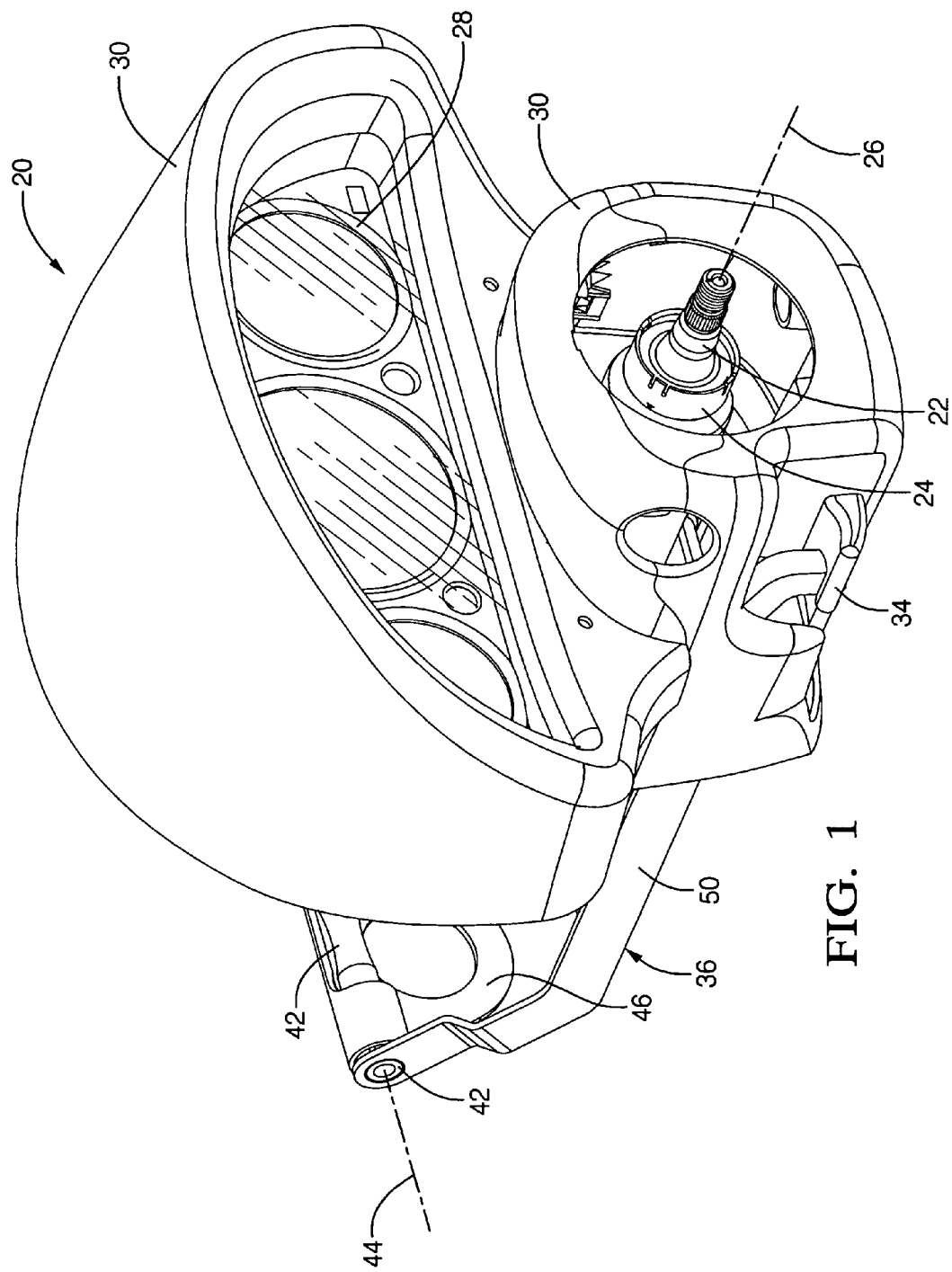
FIG. 1 is a front perspective view of a steering column assembly.

Referring to the Figures, wherein like numerals indicate corresponding parts throughout the several views, an adjustable steering column assembly for a vehicle is generally shown at 20 in FIGS. 1-4. The adjustable steering column assembly 20 includes a steering column 22 with an outer jacket 24, moveable along an axis 26. The steering column 22 has a shaft which extends into an operator compartment of the vehicle for accepting a steering wheel (not shown). The axis 26 is generally longitudinal and corresponds to a telescoping movement of the steering column 22. An instrument panel 28 is coupled to the outer jacket 24 and displays vehicle operation status information. An instrument panel hood 30 substantially encloses and is connected to the instrument panel 28 and the outer jacket 24. Due to this interconnecting, the instrument panel hood 30 facilitates coordinated movement of the instrument panel 28 and the outer jacket 24. The instrument panel hood 30 preferably also encloses the outer jacket 24 and may be formed of multiple components. As illustrated, the instrument panel hood 30 is formed of two primary shrouds. The connection of the instrument panel hood 30 to the instrument panel 28 and the outer jacket 24 may be accomplished in any suitable manner.

Figure 2:
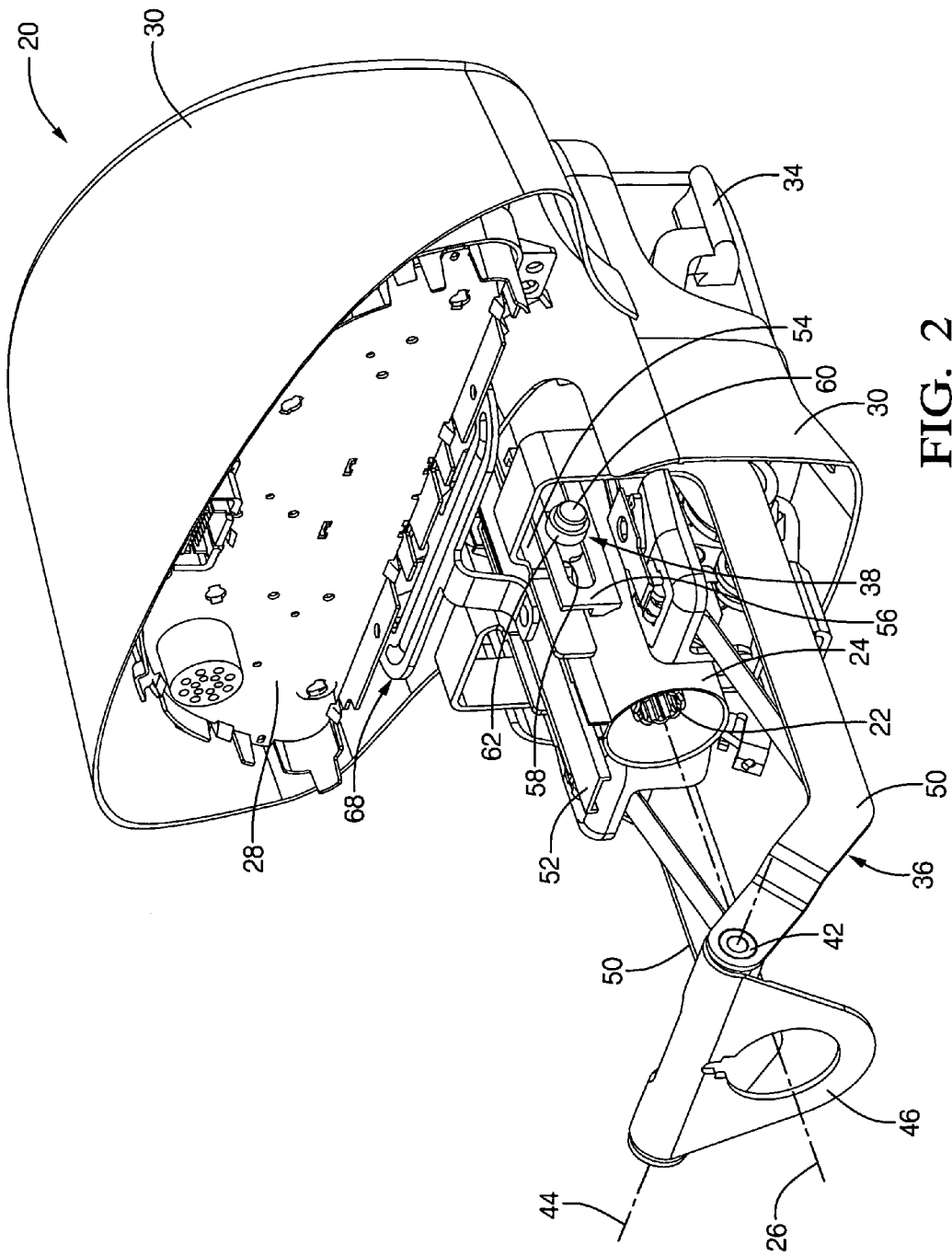
FIG. 2 is a back perspective view of the steering column assembly.

As is shown in FIG. 2, a support bracket 36 is provided for independently supporting the instrument panel 28 and the outer jacket 24. The support bracket 36 has a first mounting component 38 coupled to the outer jacket 24 which supports the outer jacket 24 during the coordinated movement relative to the first mounting component 38. The support bracket 36 also includes a second mounting component 40 coupled to the instrument panel 28 which supports the instrument panel 28 independently of the outer jacket 24 during the coordinated movement relative to the second mounting component 40. The coordinated movement discussed above is preferably a coordinated sliding movement along the axis 26.

As previously discussed, the instrument panel 28 and the outer jacket 24 are independently supported by the support bracket 36. The load from the instrument panel 28 is carried by the second mounting component 40 which in turn, transmits the load to the support bracket 36. The outer jacket 24 does not bear the load associated with the instrument panel 28 during the coordinated movement of the instrument panel 28 and the outer jacket 24.

Figure 3:
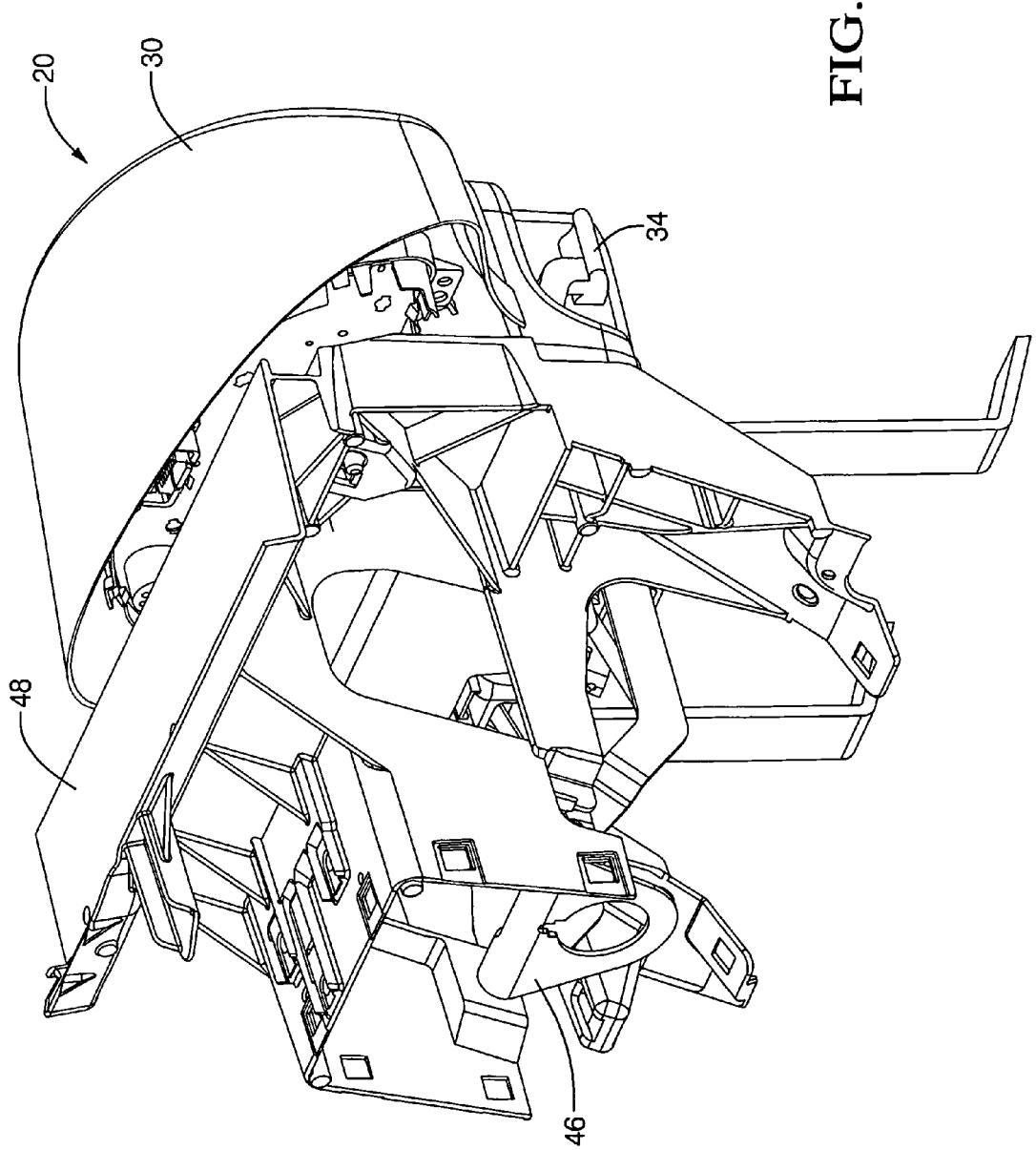
FIG. 3 is a back perspective view of the steering column assembly with a vehicle structure.
Figure 4:
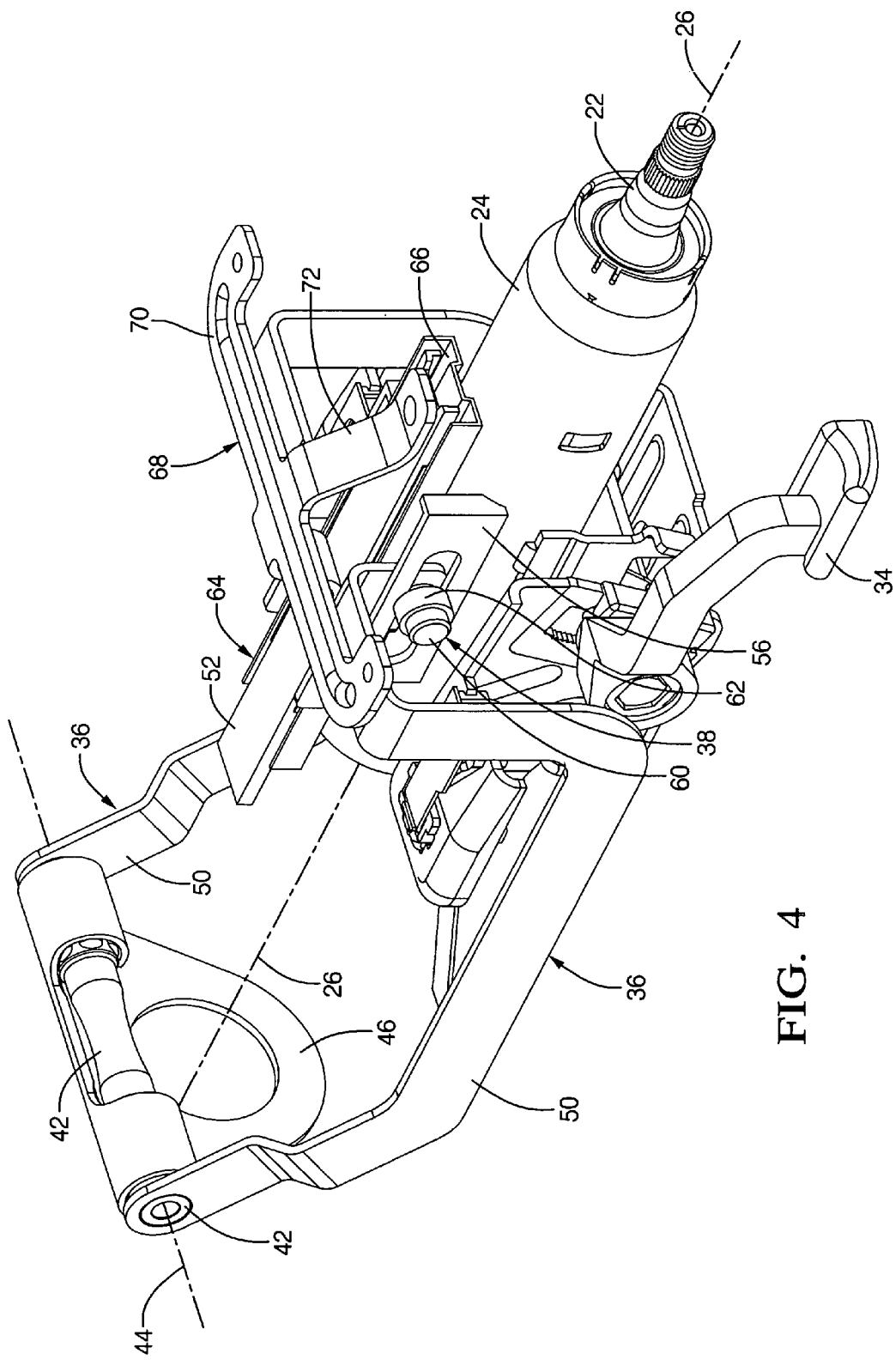
FIG. 4 is a perspective view of a steering column and a support bracket.
Figure 5:
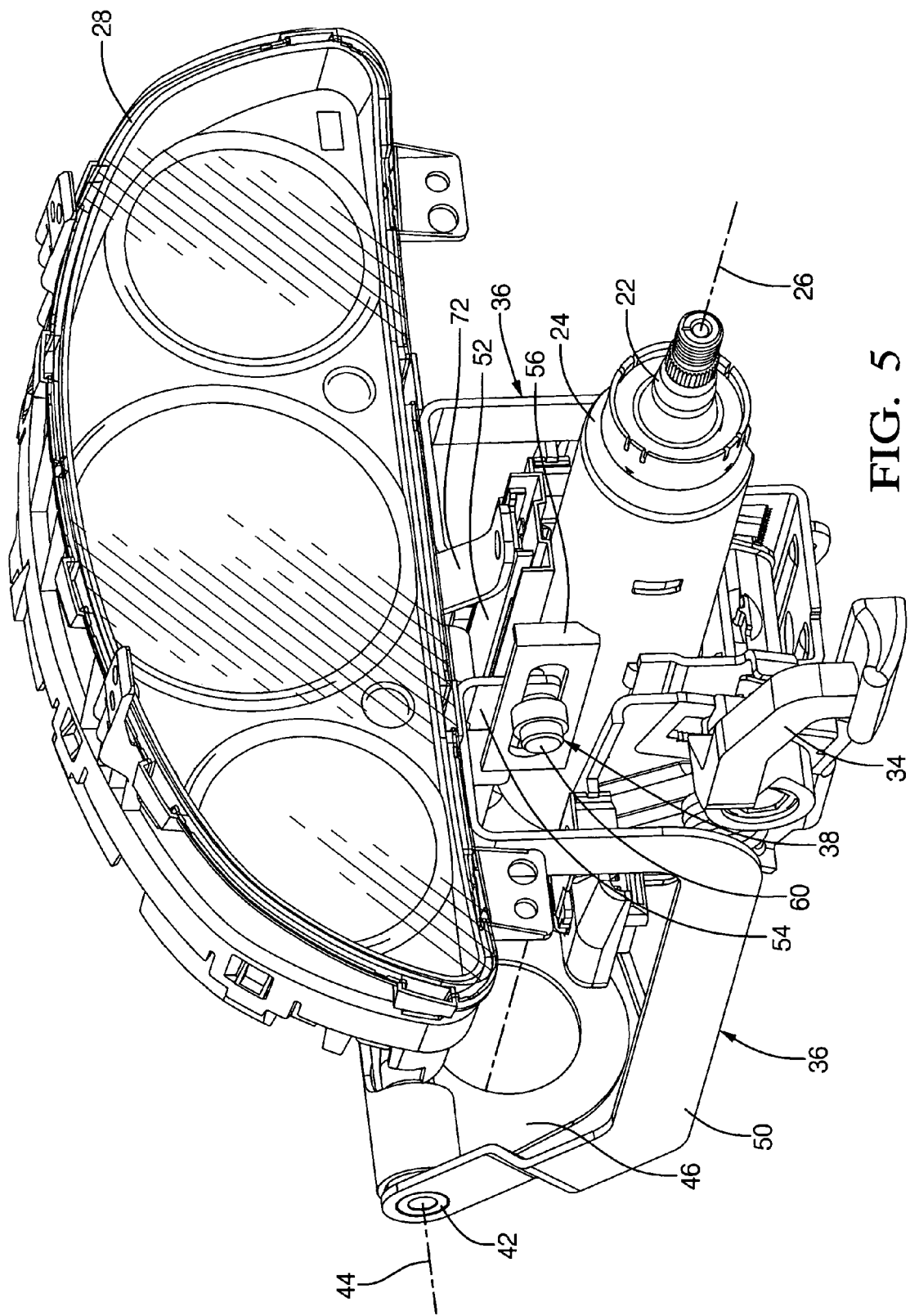
FIG. 5 is a front perspective view of the steering column and support bracket with the instrument panel coupled to the support bracket.
Figure 6:
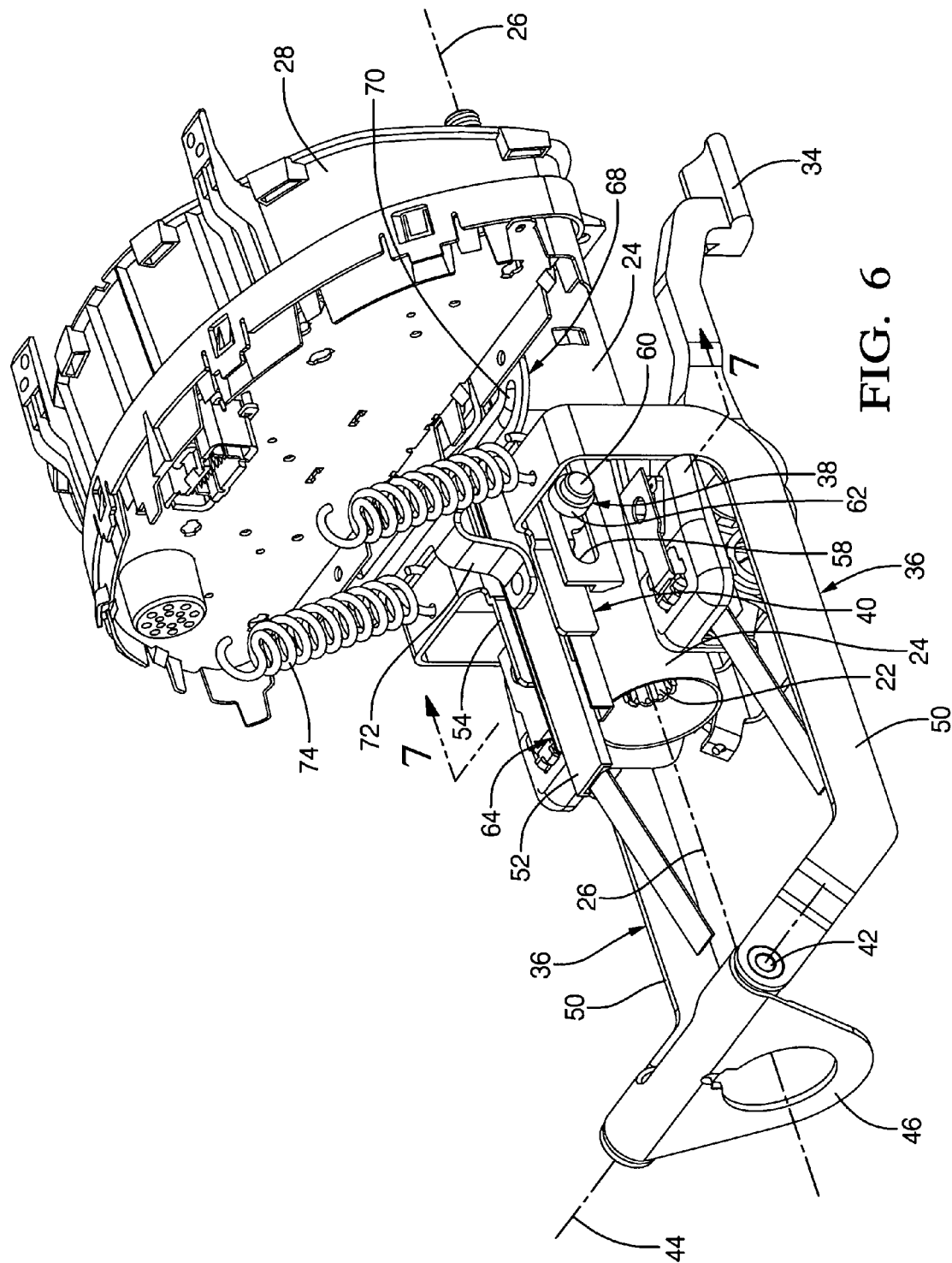
FIG. 6 is a back perspective view of the steering column and the support bracket with the instrument panel.

As is best shown in FIGS. 3-4, a vehicle structure 48 substantially surrounds a portion of the adjustable steering column assembly 20. The support bracket 36 includes a pivot pin 42, for defining a pivot axis 44. The pivot axis 44 is transverse to the longitudinal axis 26. The support bracket 36 is mounted to the vehicle structure 48 at the pivot pin 42. The coordinated movement discussed above is preferably also a pivoting movement of the outer jacket 24 and the instrument panel 28 along the pivot axis 44 between an upper limit and a lower limit. A steering column guide bracket 46 accepts a portion of the steering column 22, and is coupled to the pivot pin 42. It can be readily appreciated that the vehicle structure 48 is included here solely for illustrative purposes, and the relationship of the present invention to the vehicle structure 48 can vary depending on the engineering requirements of the specific application.

Referring also to FIGS. 4-8, the support bracket 36 includes a pair of support arms 50 extending substantially parallel to the axis 26. It can be readily appreciated that the support arms 50 can include a number of shapes and can be positioned differently relative to the axis 26. Each of the support arms 50 includes a flange 54. The first mounting component 38 is connected to the flange 54 of each of the support arms 50. The first mounting components 38 each include a mounting pin 60 extending outwardly from the flange 54.

The outer jacket 24 is slideably coupled to the support bracket 36 by the first mounting components 38. The outer jacket 24 includes a pair of support bracket tabs 56 extending outwardly from the outer jacket 24 and defining generally elongated slots 58. The mounting pins 60 are disposed within the slots 58 and are slideable within the slots 58. A retaining ring 62 is adjacent to and connected to each mounting pin 60 and retains the mounting pin 60 in the slot 58. It can be readily appreciated that the mounting pins 60 can take on a number of alternative shapes including a bolt with an integral shoulder acting as the retaining ring 62 and including a roller adjacent the retaining ring 62 to facilitate the slideable movement of the mounting pins 60 within the slots 58.

Figure 7:
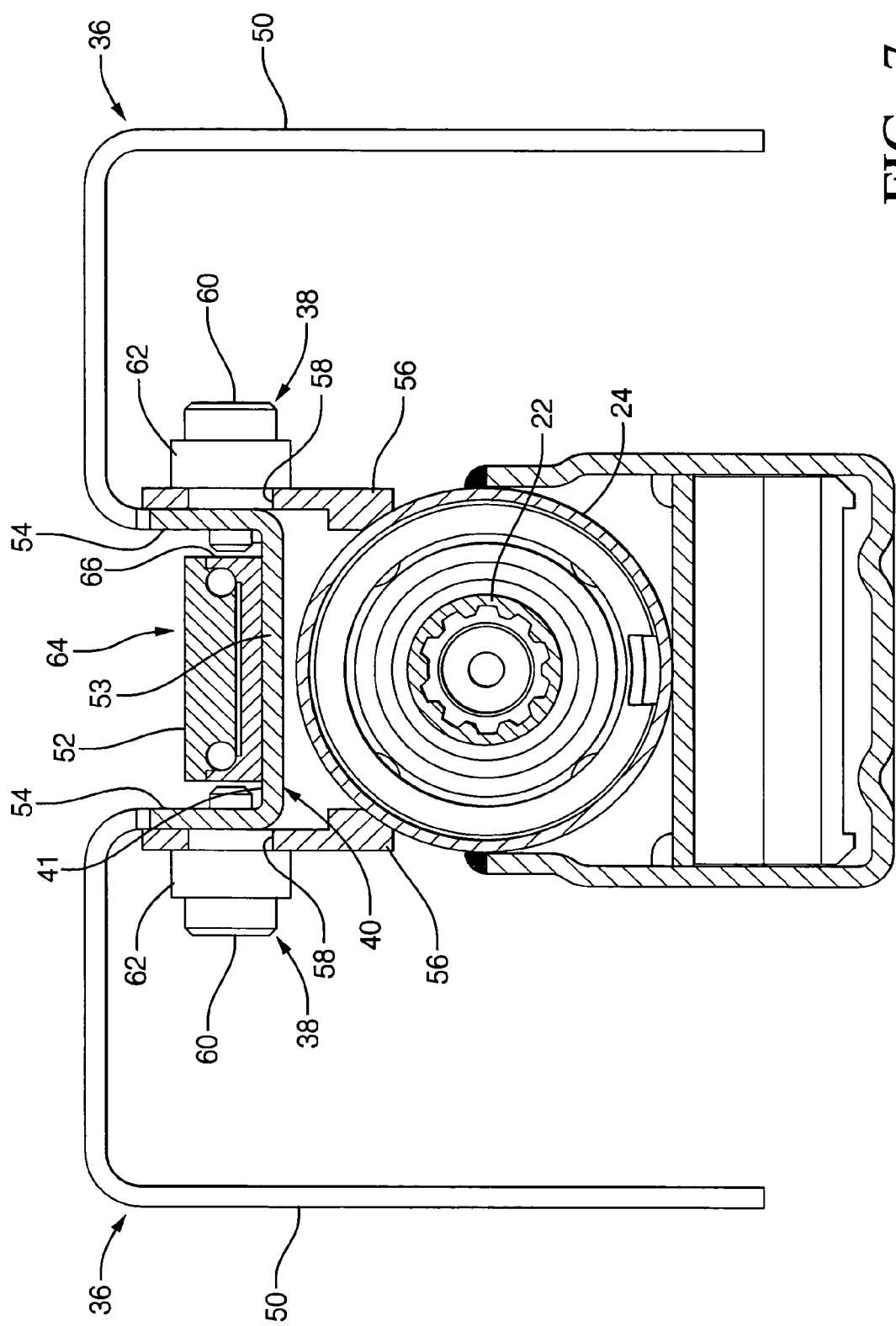
FIG. 7 is a cross-sectional view taken along line 7-7 in FIG. 6.

The instrument panel 28 is slideably coupled to the support bracket 36 at the second mounting component 40. As is best shown in FIG. 7, the second mounting component 40 generally defines a channel 41 and is connected between the flanges 54 in a different direction from the first mounting components 38. The second mounting component 40 includes a base 53 which has a length substantially parallel to the axis 26. The base 53 is in a spaced relationship with the outer jacket 24. A rail 64 is connected to and disposed within the channel 41. The rail 64 includes a slide track 66 and a slide arm 52 slideably connected to and disposed within the slide track 66. The slide track 66 is adjacent the base 53, with the base 53 serving as a platform. The slide arm 52 is slideable within the slide track 66 along a path defined by the slide track 66. It can be readily appreciated that the channel 41 can have different dimensions depending on the requirements of the application. Similarly, it can be appreciated that the rail 64 can be constructed in a variety of ways, employing a variety of slide track 66 and slide arm 52 configurations, including a ball slide mechanism to facilitate the slideable movement of the slide arm 52 within the slide track 66.

Figure 8:
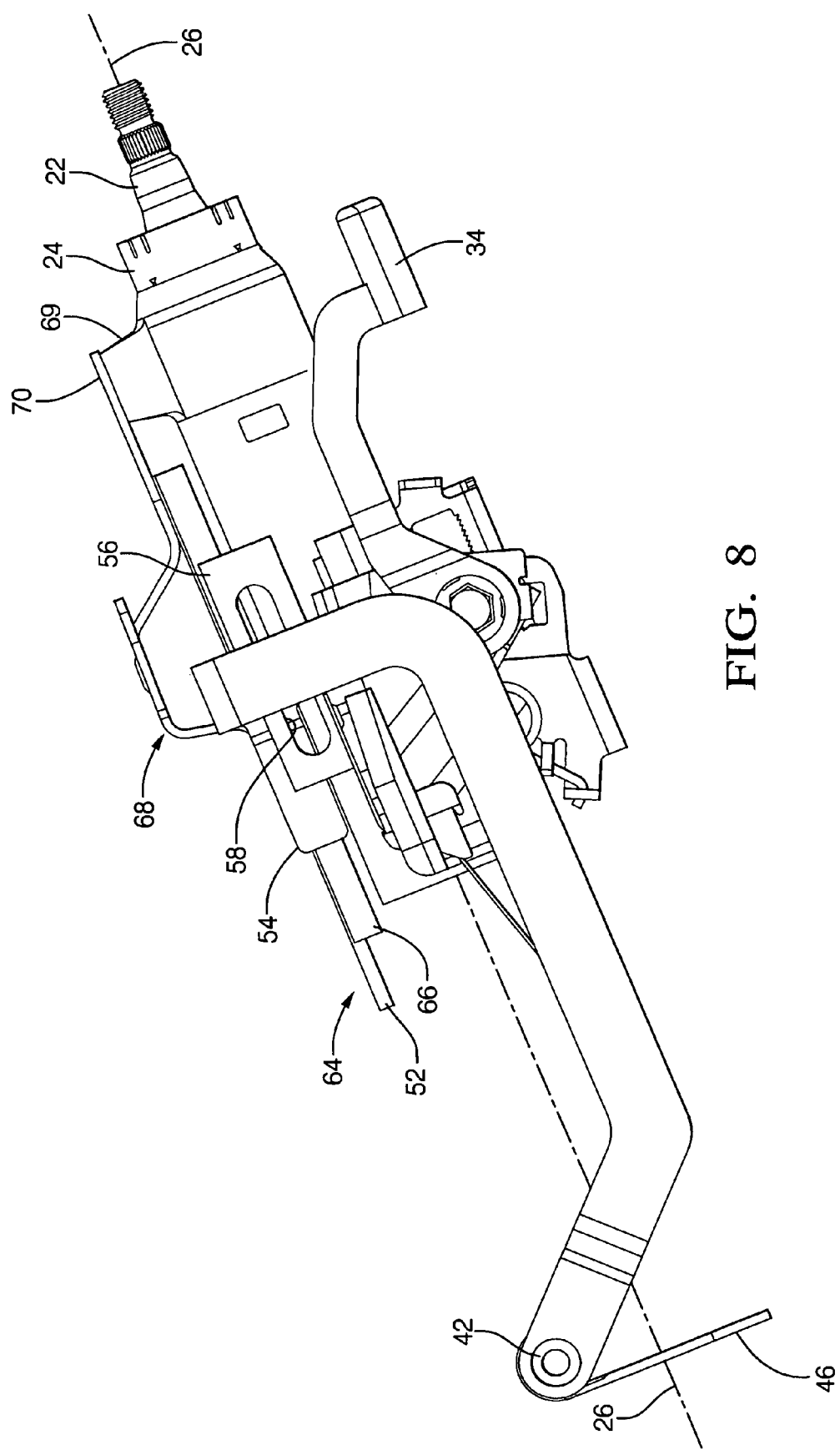
FIG. 8 is a side perspective view of the steering column, the support bracket, an instrument panel mounting bracket and a connecter bracket.

An instrument panel mounting bracket 68 connects the instrument panel 28 to the slide arm 52. The instrument panel mounting bracket 68 includes a horizontal support component 70 connected to the instrument panel 28 and a vertical support component 72 connected to the slide arm 52 of the rail 64. The vertical support component 72 permits the instrument panel 28 to clear the support arm 50 of the support bracket 36 during the coordinated movement. Both the horizontal support component 70 and the vertical support component 72 balance and stabilize the instrument panel 28. As is best shown in FIG. 8, the slide arm 52 can be coupled to the outer jacket 24 by the vertical support component 72 which can be extended along the axis 26 and coupled to the outer jacket 24 by a bracket connector 69. It can be appreciated that the coupling of the slide arm 52 to the outer jacket 24 by the instrument panel mounting bracket 68 further facilitates the coordinated movement previously discussed. It can be appreciated that the slide arm 52 can be coupled to the outer jacket 24 in other ways including by an extension bracket separate from the instrument panel mounting bracket 68. It can also be appreciated that the instrument panel mounting bracket 68 can have a number of other shapes and configurations. Alternatively, in some applications, the instrument panel 28 could be connected directly on the slide arm 52.

A spring 74, having a pair of ends, is connected to the support bracket 36 for biasing the support bracket 36 toward the upper limit of the pivot axis 44 and for supporting the instrument panel 28. The spring 74 can be connected to the support bracket 36 in a number of locations on the support bracket 36. Alternatively, more than one spring 74 can be used. It can further be appreciated that the spring 74 could be connected to a cable which is directly connected to the support bracket 36. The end of the spring 74 not connected to the support bracket 36 can be connected to a variety of locations, including but not limit to, the vehicle structure 48.

A locking mechanism 34 is coupled to the steering column 22 and prevents the coordinated movement of the instrument panel 28 and the outer jacket 24. It can be appreciated that many configurations for the locking mechanism 34 are possible.

During the operation of the vehicle, the operator can select a position for the steering wheel by adjusting the position of the outer jacket 24 using one or both of the types of coordinated movement discussed previously. The first type of coordinated movement occurs when the outer jacket 24 and instrument panel 28 move in a telescoping motion along the axis 26. The second type of coordinated movement occurs when the outer jacket 24 and the instrument panel 28 move in a pivoting motion along the pivot axis 44. To initiate the telescoping motion, the operator disengages the locking mechanism 34 previously discussed. The outer jacket 24 which is slideably coupled to the first mounting component 38 of the support bracket 36 moves along the axis 26. The movement of the outer jacket 24 is possible because the mounting pin 60 of the first mounting component 38 is disposed within the slot 58 of the support bracket 36 which connected to the outer jacket 24. The outer jacket 24 is moveable a distance defined by the slot 58 wherein the pin 60 slides within the slot 58 during the coordinated movement. The instrument panel 28 which is slideably coupled to the support bracket 36 independently of the outer jacket 24, is also slideable along the axis 26. The movement of the instrument panel 28 is possible because the instrument panel 28 is coupled to the rail 64 by the connection between the instrument panel support bracket 68 and the slide arm 52. The instrument panel 28 is movable a distance defined by the rail 64 wherein the slide arm 52 which supports the instrument panel 28, slides within the slide track 66 during the coordinated movement. The instrument panel 28 and the outer jacket 24 are moveable along the axis 26 independently of each other by the first mounting component 38 of the support bracket 36 and the second mounting component 40 of the support bracket 36. The key to the coordinated movement of the instrument panel 28 and the outer jacket 24 is the coupling of the instrument panel hood 30 to the instrument panel 28 and the outer jacket 24. This interconnectivity causes the instrument panel 28 to move with the outer jacket 24, and facilitates the coordinated movement along the axis 26 during the telescoping movement. As a result, the instrument panel 28 remains a constant distance from the steering wheel. When the operator has selected the desired position of the steering wheel, the operator reengages the locking mechanism 34 to retain the outer jacket 24 in the selected position.

The other type of coordinated movement is the pivoting movement of the outer jacket 24 and the instrument panel 28 along the pivot axis 44 between an upper limit and a lower limit. The support bracket 36 includes a pivot pin 42 which defines the pivot axis 44. The instrument panel 28 is coupled to the second mounting component 40 of the support bracket 36 and the outer jacket 24 is coupled to the first mounting component 38 of the support bracket 36 independently of the instrument panel 28. As previously discussed, the instrument panel hood 30 is coupled to the instrument panel 28 and the outer jacket 24, and this interconnectivity facilitates the coordinated movement of the instrument panel 28 and the outer jacket 24. To initiate the pivoting movement, the operator disengages the locking mechanism 34 previously discussed. The outer jacket 24 is moveable along the pivot axis 44 between the upper and the lower limit. Coordinated movement takes place when the outer jacket 24 is moved along the pivot axis 44, and the instrument panel 28 moves with the outer jacket 24 along the pivot axis 44. Further, when the coordinated movement takes place along the pivot axis 44 toward the upper limit, the spring 74 which causes the support bracket 36 to be biased toward the upper limit, further alleviates load from the outer jacket 24 and makes the movement toward the upper limit easier. When the operator has selected the desired position of the steering wheel, the operator reengages the locking mechanism 34 to retain the outer jacket 24 in the selected position.

Obviously, many modifications and variations of the present invention are possible in light of the above teachings without departing from the essential scope thereof. Therefore, the invention is not intended to be limited to the particular embodiment disclosed, but that the invention will include all embodiments falling within the scope of the appended claims. The reference numerals are merely for convenience and are not to be read in any way as limiting.

What is claimed is:

1. An adjustable steering column assembly for a vehicle, said assembly comprising:
    a steering column having an outer jacket moveable along an axis;
    an instrument panel coupled to said outer jacket for coordinated movement with said outer jacket along said axis;
    a support bracket having a first mounting component coupled to said outer jacket supporting said outer jacket during said coordinated movement relative to said first mounting component and a second mounting component coupled to said instrument panel supporting said instrument panel independently of said outer jacket during said coordinated movement relative to said second mounting component for alleviating any loads associated with said instrument panel from said outer jacket during said coordinated movement of said instrument panel and said outer jacket; and
    said outer jacket is slideably coupled to said first mounting component for movement along said axis.

2. An assembly as set forth in claim 1 wherein said instrument panel is slideably coupled to said second mounting component for movement along said axis.

3. An assembly as set forth in claim 2 including a rail connected between said second mounting component and said instrument panel for slideably coupling said instrument panel to said second mounting component to facilitate said movement along said axis.

4. An assembly as set forth in claim 3 wherein said rail further includes a slide track mounted to said second mounting component and a slide arm slideably connected to said slide track with said instrument panel connected to said slide arm for slideably coupling said instrument panel to said second mounting component.

5. An assembly as set forth in claim 4 including an instrument panel mounting bracket for connecting said instrument panel to said rail.

6. An assembly as set forth in claim 4 including a bracket connecter mounted between said slide arm and said outer jacket for facilitating said coordinated movement of said instrument panel and said outer jacket.

7. An assembly as set forth in claim 1 including an instrument panel hood substantially enclosing said instrument panel and connected to said instrument panel and said outer jacket for facilitating said coordinated movement of said instrument panel with said outer jacket.

8. An assembly as set forth in claim 1 wherein said support bracket further includes a pivot pin defining a pivot axis for coordinated movement of said outer jacket and said instrument panel along said pivot axis between an upper limit and a lower limit.

9. An assembly as set forth in claim 8 including a spring coupled to said support bracket for biasing said support bracket toward said upper limit.

10. An assembly as set forth in claim 1 wherein said first mounting component includes a mounting pin.

11. An assembly as set forth in claim 10 wherein said outer jacket includes a support bracket tab defining a generally elongated slot with said mounting pin disposed within said slot for slideably connecting said outer jacket to said support bracket.

12. An assembly as set forth in claim 11 wherein said first mounting component further includes a retaining ring for retaining said mounting pin in said slot.

13. An assembly as set forth in claim 1 wherein said second mounting component further defines a channel.

14. An assembly as set forth in claim 13 including a rail disposed within said channel of said second mounting component.

15. An assembly as set forth in claim 14 wherein said instrument panel is mounted to said rail for slideably coupling said instrument panel to said support bracket.

16. An assembly as set forth in claim 1 wherein said support bracket further includes a pair of support arms with each of said support arms further including a flange.

17. An assembly as set forth in claim 16 wherein said second mounting component is connected between said flanges.

18. An assembly as set forth in claim 17 wherein said first mounting component is further defined as a pair of first mounting components with one of said first mounting components connected to each said flange extending outwardly from said flanges in different directions from said second mounting component.

19. An assembly as set forth in claim 1 including a locking mechanism coupled to said steering column for preventing said coordinated movement of said outer jacket and said instrument panel.

20. An adjustable steering column assembly for a vehicle, said assembly comprising:
   a steering column having an outer jacket moveable along an axis;
   an instrument panel coupled to said outer jacket for coordinated movement with said outer jacket along said axis;
   a support bracket having a first mounting component coupled to said outer jacket supporting said outer jacket during said coordinated movement relative to said first mounting component and a second mounting component coupled to said instrument panel supporting said instrument panel independently of said outer jacket during said coordinated movement relative to said second mounting component for alleviating any loads associated with said instrument panel from said outer jacket during said coordinated movement of said instrument panel and said outer jacket; and
   said instrument panel is slideably coupled to said second mounting component for movement along said axis.

21. An adjustable steering column assembly for a vehicle, said assembly comprising:
   a steering column having an outer jacket moveable along an axis;
   an instrument panel coupled to said outer jacket for coordinated movement with said outer jacket along said axis;
   a support bracket having a first mounting component coupled to said outer jacket supporting said outer jacket during said coordinated movement relative to said first mounting component and a second mounting component coupled to said instrument panel supporting said instrument panel independently of said outer jacket during said coordinated movement relative to said second mounting component for alleviating any loads associated with said instrument panel from said outer jacket during said coordinated movement of said instrument panel and said outer jacket; and
   said support bracket including a pivot pin defining a pivot axis for coordinated movement of said outer jacket and said instrument panel along said pivot axis between an upper limit and a lower limit.

* * * * *